United States Patent [19]

Stournas

[11] 4,174,309
[45] Nov. 13, 1979

[54] POLYISOCYANATE CROSS-LINKED ALKYLENE OXIDE-LINEAR NON-IONIC POLYSACCHARIDE REACTION PRODUCT

[75] Inventor: Stamoulis Stournas, Flemington, N.J.

[73] Assignee: Mobil Oil Corporation, New York, N.Y.

[21] Appl. No.: 888,485

[22] Filed: Mar. 20, 1978

Related U.S. Application Data

[62] Division of Ser. No. 708,727, Jul. 26, 1976, Pat. No. 4,096,074.

[51] Int. Cl.$^2$ .............................................. C08L 1/28
[52] U.S. Cl. ..................................... 260/13; 166/274; 166/275; 252/8.55 D; 252/8.55 R; 260/9; 528/73; 528/77
[58] Field of Search ......................................... 260/13

[56] References Cited

U.S. PATENT DOCUMENTS

| | | | |
|---|---|---|---|
| 2,266,777 | 12/1941 | Lieser | 536/32 |
| 3,042,666 | 7/1962 | Gentles | 536/120 |
| 3,079,336 | 2/1963 | Stright et al. | 252/8.55 |
| 3,079,337 | 2/1963 | Turbak et al. | 252/8.55 |
| 3,085,085 | 4/1963 | Wismer et al. | 536/120 |
| 3,106,551 | 10/1963 | Lindenfors | 536/89 |
| 3,153,002 | 10/1964 | Wismer et al. | 521/131 |
| 3,208,518 | 9/1965 | Patton | 166/9 |
| 3,215,634 | 11/1965 | Walker | 252/311 |
| 3,252,904 | 5/1966 | Carpenter | 252/8.55 |
| 3,292,696 | 12/1966 | Sandiford | 166/9 |
| 3,311,608 | 3/1967 | Murphy | 536/30 |
| 3,315,743 | 4/1967 | Abdo et al. | 166/9 |
| 3,492,255 | 1/1970 | Cobbledick | 260/18 |
| 3,567,661 | 3/1971 | Patton et al. | 521/175 |
| 3,640,997 | 2/1972 | Fijal | 536/120 |
| 3,677,961 | 7/1972 | Browning | 252/316 |
| 3,689,442 | 9/1972 | Taub | 260/9 |
| 3,697,498 | 10/1972 | Browning et al. | 260/124 R |
| 3,727,687 | 4/1973 | Clampitt et al. | 166/274 |
| 4,096,074 | 6/1978 | Stournas | 252/8.55 D |

Primary Examiner—Edward M. Woodberry
Attorney, Agent, or Firm—C. A. Huggett; William D. Jackson

[57] ABSTRACT

A method for the recovery of oil from an oil-containing subterranean formation by waterflooding employing as an injection medium an aqueous solution of a viscosifier comprising the water-soluble reaction product of an organic polyisocyanate and the addition product of an alkylene oxide and linear, non-ionic polysaccharide, said addition product having a molecular weight of at least about 100,000. According to a preferred form of the invention, a polyisocyanate cross-linked hydroxyethyl cellulose is utilized as a viscosifier to decrease the mobility ratio between the injected water and oil, thereby improving the efficiency of the waterflood. The novel viscosifiers which comprise one form of the invention are characterized by an improved resistance to the effect of divalent metal ions present in the formation as well as a thermal stability which is superior to that of the viscosifiers currently used in waterflooding operations. Aqueous solutions of the viscosifiers of the invention are characterized by viscosities which are reversible with shear rate.

7 Claims, No Drawings

POLYISOCYANATE CROSS-LINKED ALKYLENE OXIDE-LINEAR NON-IONIC POLYSACCHARIDE REACTION PRODUCT

This application is a divisional of application Ser. No. 708,727, filed July 26, 1976, now U.S. Pat. No. 4,096,074, issued June 20, 1978.

BACKGROUND OF THE INVENTION

This invention relates to the recovery of oil from subterranean reservoirs and, more particularly, to new and improved secondary recovery operations utilizing flood water including a novel viscosifier for mobility control.

In the recovery of oil from oil-bearing reservoirs, it usually is possible to recover only a minor portion of the original oil in place by the so-called primary recovery methods which utilize only the natural forces present in the reservoir. Thus, a variety of supplemental recovery techniques have been employed in order to increase the recovery of oil from subterranean reservoirs. In the supplemental techniques, which are commonly referred to as secondary recovery operations although in fact they may be primary or tertiary in sequence of employment, fluid is introduced into the reservoir in order to displace the oil therein to a suitable production system through which the oil may be withdrawn to the surface of the earth. The displacing medium may be a gas, an aqueous liquid, such as fresh water or brine, an oil-miscible liquid such as butane, or a water and oil-miscible liquid such as alcohol. Generally, the most promising of the secondary recovery techniques involves the injection into the reservoir of an aqueous flooding medium, either alone or in combination with other fluids.

One difficulty which often is encountered in secondary recovery operations is the relatively poor sweep efficiency of the injected displacing liquid. That is, the displacing liquid exhibits a tendency to channel through certain portions of the reservoir and to bypass other portions. Such poor sweep efficiency is occasioned by differences between the viscosity of the injected displacing medium and the in situ reservoir oil and also by permeability variations within the reservoir. The reservoir may comprise a plurality of fairly well-defined zones of widely diverse permeabilities. The injected displacing fluid preferentially flows through the more permeable zones of the reservoir thus leading to premature breakthrough of the displacing fluid at the production well or wells.

Even when the reservoir exhibits a relatively uniform permeability throughout, a situation referred to as instability fingering may develop in those instances where the viscosity of the injected displacing fluid is significantly less than the viscosity of the in situ reservoir oil. In this situation, the less viscous displacing fluid tends to develop fingers or bulges which may be caused by points of minute heterogeneities in the reservoir. These fingers of displacing fluid tend to become extended in the direction of flow and travel at a faster rate than the remainder of the injected fluid, thus again resulting in premature breakthrough at the production system.

Various techniques have been proposed in order to improve the sweep efficiency of the injected displacing fluid and thus avoid premature breakthrough. For example, it has been proposed in waterflooding operations to add thickening agents to at least a portion of the aqueous flooding medium in order to increase the viscosity thereof. The viscosity of the flooding medium may be increased prior to its injection into the reservoir or alternatively the viscosity may be increased in situ in order to avoid a reduction in injectivity at the injection well. For example, in U.S. Pat. No. 3,208,518 to Patton, there is disclosed a waterflooding process wherein the visocity of the flooding medium is increased in situ through the use of high molecular weight polymers such as ionic polysaccharides produced by the fermentation of carbohydrates by bacteria of the genus Xanthomonas, under controlled pH conditions.

Another technique whereby the viscosity of the aqueous displacing medium may be increased in situ involves the injection of a shear-thinning liquid. For example, as disclosed in U.S. Pat. No. 3,292,696 to Sandiford, an aqueous solution of hydroxyethyl cellulose which exhibits a relatively low viscosity at high shear rates may be injected in order to displace oil from the formation. Also, as disclosed for example in U.S. Pat. No. 3,315,743 to Abdo et al, it has been proposed to inject an aqueous shear-thickening liquid in a waterflooding procedure.

The concept of heating hydroxyethyl cellulose to increase its viscosity in aqueous solution is disclosed in U.S. Pat. No. 3,106,551—Lindenfors. Further, U.S. Pat. No. 3,677,961—Browning et al discloses the crosslinking of a blend of a galactomannan gum and an ionic polysaccharide produced by the fermentation of carbohydrates by bacteria of the genus Xanthomonas with a chelate cross-linking agent and a metal ion as the acceptor selected from the class consisting of the metals of the first series of the transition elements of the Periodic Table and an organic polyelectrolyte ligand as the donor. The crosslinking of the hydroxyethyl cellulose with the use of polyvalent metal ions is also disclosed in U.S. Pat. No. 3,727,687—Clampitt whereas the preparation of viscous liquids by crosslinking solid water-soluble polysaccharides containing cis-hydroxyl groups with a cross-linking agent yielding borate ions in solution is disclosed in U.S. Pat. No. 3,215,634—Walker. The use of a chelating composition formed of an organic polyelectrolyte ligand component and a component of a metal of the first series of the transition elements of the Periodic Table for use in crosslinking macromolecular polysaccharide materials is disclosed in U.S. Pat. No. 3,697,498—Browning et al. Finally, the production of polyurethane prepolymers useful in the production of rigid foams by reacting an excess of a polyisocyanate and the addition product of an alkylene oxide having at least three carbon atoms with a hydroxy compound having at least six hydroxyl groups, such as a mixture of sorbitol and sucrose, is disclosed in U.S. Pat. No. 3,847,347—Satterly.

SUMMARY OF THE INVENTION

In accordance with the present invention, there is provided a new and improved oil recovery process wherein an aqueous solution of a viscosifier comprising the water-soluble reaction product of an organic polyisocyanate and the addition product of an alkylene oxide and a linear, non-ionic polysaccharide is injected to an oil-containing subterranean formation to decrease the mobility ratio between the injected water and oil and to improve the efficiency of the waterflood. The invention is practiced in a subterranean reservoir which is penetrated by spaced injection and production systems defining a recovery zone of the reservoir. In carrying out the invention, an aqueous driving agent containing the viscosifier of the invention is injected into the reservoir through the injection system. In accordance with the invention, the viscosifier is employed in the flooding water in an amount sufficient to increase its viscosity. In some cases, a total concentration of as small as 0.005% by weight will be satisfactory. Generally speaking, a total concentration ranging from about 0.01% to about 1%, and preferably from 0.05% to about 0.5%, is employed.

In general, any organic polyisocyanate may be used in the production of the novel viscosifier compositions of the invention. The polyisocyanates employed may be aliphatic or aromatic isocyanates having two, three or more reactive isocyanato groups. Examples of these isocyanates are hexamethylene diisocyanate, ethylene diisocyanate, cyclohexylene-1,2-diisocyanate, m-phenylene diisocyanate, 2,4-toluene diisocyanate, 2,6-toluene diisocyanate, 3,3'-dimethyl 4,4'-biphenyl diisocyanate, 1,5-naphthalene diisocyanate, p-phenylene diisocyanate, p,p'-methylene diphenyl diiscoyanate, 3,3'-dichloro, 4,4'-biphenylene diisocyanate and naphthalene triisocyanates. Other polyisocyanates useful in the practice of the invention will readily occur to those skilled in the art. If desired, a mixture of two or more different polyisocyanates may be used in the production of the novel viscosifiers of the invention. A mixture of 2,4- and 2,6-toluene diisocyanate may advantageously be used because of its availability and relative low cost.

In accordance with the invention, the organic polyisocyanate is reacted with the addition product of an alkylene oxide and a linear, non-ionic polysaccharide, the addition product having a molecular weight of at least 100,000 and preferably of at least about 300,000. The alkylene oxides useful in the production of such addition products will generally include compounds having the formula

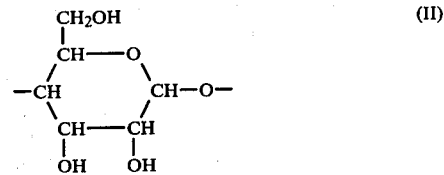

wherein $R_1$, $R_2$, $R_3$ and $R_4$ are the same or different and are selected from the class consisting of hydrogen and lower alkyl groups containing from one to five carbon atoms, such as methyl, ethyl, propyl, butyl and pentyl groups. Preferably, at least one of $R_1$, $R_2$, $R_3$ and $R_4$ is hydrogen and the total number of carbons comprising $R_1$, $R_2$, $R_3$ and $R_4$ attached to the oxirane ring does not exceed five. Examples of suitable alkylene oxides useful in the practice of the invention are ethylene oxide, propylene oxide, butylene oxide, pentylene oxide, 1-methyl-2-pentene oxide, trimethylene oxide and tetramethylene oxide. Other suitable alkylene oxides useful in the practice of the invention will readily occur to those skilled in the art. If desired, a mixture of two or more different alkylene oxides may be used to provide the viscosifiers of the invention. The amount of alkylene oxide used in the preparation of the viscosifiers of the invention may vary within wide limits and will to a large extent depend upon the polysaccharide used. Generally, enough alkylene oxide is reacted with the polysaccharide to make the resulting addition product as well as the polyisocyanate cross-linked addition product water soluble. As used herein the expression "water soluble" means that the viscosifiers of the invention are sufficiently soluble in water to provide aqueous solutions including at least one percent by weight of the dissolved viscosifier. Preferably, the alkylene oxides will comprise ethylene and propylene oxides, and mixtures thereof, and the alkylene oxide content of the addition product will vary from about 30% by weight to about 70% by weight of the total addition product.

The polysaccharides useful in the practice of the invention are the linear, non-ionic polysaccharides. Suitable polysaccharides include cellulose and starches, such for example as amylose. Generally speaking, the polysaccharide used in the practice of the invention will be formed of repeating structural units of the formula

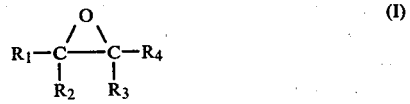

The useful polysaccharides include those which are not per se water soluble, but which are rendered water soluble by reaction with the alkylene oxides as described above to provide non-ionic polysaccharide ethers which may then be crosslinked with the polyisocyanate to provide the novel viscosifier components of the invention. In this connection, the amount of polyisocyanate used to crosslink the polysaccharide ether may vary within wide limits provided that the resulting cross-linked product is water soluble. Generally, an amount of polyisocyanate is employed such that there is a minimum of an average of one crosslink derived from the polyisocyanate for every 2,000 repeating structural units of the type described in Formula II above, up to a maximum of an average of one crosslink for every 20 of such repeating structural units. Stated otherwise, the molar amount of polyisocyanate that should be used to crosslink the alkylene oxide-polysaccharide addition product will range from a value of (0.0005n/m) to a value of (0.5n/m) where n is the number of repeating units of Formula II above in the polysaccharide, and m is the average number of isocyanato groups per polyisocyanate molecule. Examples of suitable polysaccharide ethers which are the product of the reaction of a linear non-ionic polysaccharide and an alkylene oxide are hydroxyalkyl celluloses, such as hydroxyethyl cellulose and hydroxypropyl cellulose, alkyhydroxyalkyl celluloses such as methylhydroxypropyl cellulose, and mixed hydroxyalkyl cellulose eithers such as hydroxyethyl, hydroxypropyl cellulose ethers. Other water-soluble non-ionic polysaccharide ethers useful in the practice of the invention will readily occur to those skilled in the art.

Polysaccharide ethers useful in the preparation of the viscosifiers of the invention may be prepared by reacting the linear, non-ionic polysaccharide with the alkylene oxide under basic conditions in the presence of a suitable solvent by procedures well known to those skilled in the art, such as for example the procedures used in the production of hydroxyethyl cellulose by reacting ethylene oxide with cellulose. Generally speaking such polysaccharide ethers will contain an average of from 2 to 5 alkylene oxide units per repeating unit of Formula II in the polysaccharide chain. The subsequent crosslinking of the polysaacharide-ether with the polyisocyanate may also be achieved by known procedures such as for example by dissolving the polysaccharide-ether adduct in a suitable solvent, such as dimethyl formamide, to provide a dilute solution (e.g. 1% by weight) to which may be added the polyisocyanate in the desired amount to obtain the required degree of crosslinking. In general, the polyisocyanate will react with the hydroxyl groups of the polysaccharide-ether at room temperature to provide intermolecular carbamate linkages. The resulting cross-linked product may then be precipitated from the solution by the addition of a non-solvent, such as, for example, isopropyl alcohol. The resulting cross-linked polymer products may then be filtered and dried under vacuum at room temperature to provide the compositions of the invention in powdered form.

DESCRIPTION OF PREFERRED EMBODIMENTS

In a preferred embodiment of the invention, the novel viscosifier comprises a diisocyanate cross-linked hydroxyethyl cellulose prepared by reacting cellulose having a molecular weight of the order of about 200,000 with ethylene oxide under basic conditions by a standard method well known in the art. The resulting hydroxyethyl cellulose had an ethylene oxide content of about 50% by weight. The cross-linked product of the invention was made by treating the hydroxyethyl cellulose with 5% molar equivalent of a polyisocyanate. Specifically, the hydroxyethyl cellulose was dissolved in dimethyl formamide to provide a solution containing about 1% by weight of the hydroxyethyl cellulose. To that solution was added 5% of a molar equivalent of toluene diisocyanate as a neat liquid, and the resulting mixture was stirred at room temperature for about two hours. The resulting cross-linked polymer which included an average of approximately one crosslink for every 20 of the repeating units which characterized the original cellulose molecule, was precipitated out of solution by the addition of isopropanol and was then filtered and dried under vacuum at room temperature.

Solutions of the foregoing cross-linked composition were then prepared using both distilled water and brine as the solvents. The brine solution contained 10% by weight of solids. The composition of the brine solids, calculated as chlorides, was:

25,304 ppm Na+
9,272 ppm Ca++
2,552 OOm Mg++

The viscosity measurements were made on the various solutions, including solutions of the untreated hydroxyethyl cellulose to afford a comparison and demonstrate the improvement in viscosity that was realized using the composition of the invention. The viscosity measurements were obtained at different shear rates with the cone and plate Brookfield viscometer, Model LTV, at temperatures of 25° C. and 65° C. The solutions in each case included 0.4% by weight of either the viscosifier of the invention or of the untreated hydroxyethyl cellulose. The results obtained are set forth in Table I below. The term "HEC" signifies the uncrosslinked hydroxyethyl cellulose. The term "X" signifies the polyisocyanate cross-linked hydroxyethyl cellulose prepared in accordance with the present invention.

TABLE I

| | VISCOSITIES OF CELLULOSE DERIVATIVES (0.4% Solutions) | | | |
|---|---|---|---|---|
| | Shear Rate | | Viscosity (CP) | |
| Solvent | (cm$^{-1}$) | Temperature | HEC | X |
| Brine | 46 | 25° C. | 2 | 10.0 |

TABLE I-continued

| | VISCOSITIES OF CELLULOSE DERIVATIVES (0.4% Solutions) | | | |
|---|---|---|---|---|
| | Shear Rate | | Viscosity (CP) | |
| Solvent | (cm$^{-1}$) | Temperature | HEC | X |
| Brine | 115 | 25° C. | 2 | 8.5 |
| Brine | 230 | 25° C. | 2 | 7.6 |
| Distilled Water | 45 | 25° C. | 2 | 11.2 |
| Distilled Water | 115 | 25° C. | 2 | 10.3 |
| Brine | 46 | 65° C. | 1 | 2.4 |
| Brine | 115 | 65° C. | 1 | 2.1 |
| Brine | 230 | 65° C. | 1 | 1.9 |

As is apparent from the data reported in Table I above, the solutions of the composition of the invention (X) were characterized by significantly improved values of viscosity in comparison to the viscosities attained by the use of hydroxyethyl cellulose alone. Moreover, the viscosity of the solutions of the composition of the invention including a high concentration of salts was actually increased at comparable shear rates. Aqueous solutions of the viscosifiers of the invention are shear thinning liquids, i.e. are liquids whose viscosity will decrease as the shear rate to which the solution is subjected is increased. It has been found, however, that the viscosity of solutions prepared in accordance with the invention is reversible with shear rate, i.e. the solution viscosity at any given or preselected shear rate value will be recaptured as the shear rate is lowered to that value.

The present invention is carried out in a recovery zone of a subterranean oil-bearing reservoir. As will be understood by those skilled in the art, the term "recovery zone", as used herein and in the appended claims is meant that portion of a reservoir through which oil is displaced to the production system by the injected displacing medium. The injection and production systems each may comprise one or more wells extending from the surface of the earth into the subterranean oil reservoir and such wells may be located and spaced from one another in any desired pattern. For example, the so-called "line flood" may be utilized in which case the injection and production systems comprise rows of wells spaced from one another. In this type of pattern, the recovery zone, as defined by the spaced rows of injection and production wells, generally will be that portion of the reservoir underlying the area between the spaced rows. Exemplary of other patterns in which the injection system comprises a central injection well and the production system comprises a plurality of production wells spaced about the injection well. Of course, the injection and production systems each may consist of only a single well in which case the recovery zone, as defined by the spaced injection and production wells, will be the portion of the reservoir underlying a generally elliptical area between these walls which is subject to the displacing action of the injected flooding medium. The above and other patterns are well known to those skilled in the art, and for a more detailed description of such patterns reference is made to Uren, L. C., "Petroleum Production Engineering—Oil Field Exploitation," Second Edition, McGraw-Hill Book Company, Inc., New York and London, 1939, and, more particularly, to the section entitled "The Waterflooding Process", appearing at pages 444-459.

It also will be recognized that the invention may be carried out utilizing one or more dually completed injection production wells of the type, for example, disclosed in U.S. Pat. No. 2,725,106 to Ralph Spearo. This arrangement sometimes may be utilized to advantage in a relatively thick oil reservoir in which it may be desirable to displace the oil in the reservoir upwardly and recover such oil from the upper portion of the reservoir. In this instance, the injection system normally would comprise the lower completion interval of one or more dually completed wells of the type described in the aforementioned patent to Spearo and the production system would comprise the upper completion interval of one or more of such wells. In this case, of course, the recovery zone would be that portion of the reservoir subject to the displacing action of the flooding medium as it moves upwardly through the reservoir. For further descriptions of other well arrangements which may be employed in waterflooding, reference is made to Calhoun, J. C., Jr., FUNDAMENTALS OF RESERVOIR ENGINEERING, University of Okalahoma Press, Norman, 1960, pp. 371–376.

The thickened flooding water including the viscosifier of the invention may comprise the entire flooding liquid displacing the oil within the subterranean formation towards the production means. Ordinarily, however, a slug of the thickened flooding water of about 0.1 to about 0.5 pore volume, and preferably from about 0.1 to about 0.3 pore volume, will prove economically advantageous in recovering oil from the subterranean formation. The term "pore volume", as used herein to define the quantities of fluids injected in carrying out the invention, designates the pore volume of the formation underlying the well pattern defined by the wells comprising the injection and production systems.

The thickened flooding water recovers more oil if the interfacial tension between it and the in situ oil is lowered. Preferably, the thickened flooding water containing the viscosifier of the invention also has a surfactant dissolved in it. The present invention may be used in connection with waterflooding processes in which an aqueous solution of petroleum sulfonates with designated equivalent weight ranges and under controlled conditions of salinity are injected, as described in a paper by W. R. Foster, entitled "A Low Tension Waterflooding Process," JOURNAL OF PETROLEUM TECHNOLOGY, 25, 205–210 (1973). Generally speaking, a concentration of surfactant is employed which will effect lowered interfacial tension between the flooding water thickened with a viscosifier in accordance with this invention and the oil it displaces within the subterranean formation. Ordinarily, a concentration of from about 0.01 to about 0.1% of the surfactant is required for the thickened flooding water to be effective. If desired, a slug of the surfactant containing water is first injected into the subterranean reservoir via the injection system followed by a thickened water slug which contains a viscosifier of the present invention in a graded concentration to provide a maximum viscosity greater than the viscosity of the reservoir oil and a terminal viscosity near that of water. This thickened water slug may then be followed by a driving fluid such as a field brine, which is injected as necessary to carry out the process of the invention.

Injection of an aqueous solution of a viscosifier of the invention, as described above, does not require special equipment over that ordinarily employed in carrying out a waterflood.

As will be appreciated by those skilled in the art, the present invention provides a new and improved method for achieving mobility control in waterflooding operations used in oil recovery. Water thickened with various polymeric materials is an integral part of tertiary oil recovery. Current polysaccharides and polyacrylamide thickeners have disadvantages in that the former are thermally unstable, and the latter are sensitive to salts. The viscosifiers used in accordance with the present invention have higher thermal stability, have a much lower sensitivity to salts, and are more economically attractive than the above polymeric thickeners.

It should be understood that while the present invention has been described in considerable detail with respect to certain specific embodiments thereof, it should not be considered limited to such embodiments but may be used in other ways without departure from the spirit of the invention and the scope of the appended claims.

What is claimed is:

1. A composition comprising the water-soluble reaction product of an organic polyisocyanate having at least two reactive isocyanato groups and the addition product of an alkylene oxide and a linear, non-ionic polysaccharide, said addition product having a molecular weight of at least about 100,000, said alkylene oxide having the formula

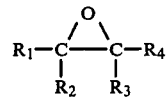

wherein $R_1$, $R_2$, $R_3$ and $R_4$ are the same or different and are selected from the class consisting of hydrogen and lower alkyl groups containing from one to five carbon atoms, said linear, non-ionic polysaccharide formed of repeating structural units having the formula

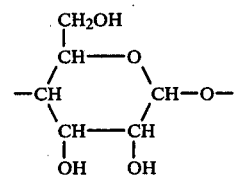

said addition product being cross-linked by said polyisocyanate such that there is a minimum of an average of one cross link for every 2,000 of said repeating structural units up to a maximum of an average of one cross link for every 20 of said repeating structural units.

2. The composition of claim 1 in which said addition product contains from about 30% to about 70% by weight of said alkylene oxide.

3. The composition of claim 1 in which said addition product comprises hydroxyethyl cellulose.

4. The composition of claim 1 in which said addition product is characterized by a molecular weight of at least about 300,000.

5. An aqueous solution of the water-soluble reaction product of an organic polyisocyanate having at least two reactive isocyanato groups and the addition product of an alkylene oxide and a linear, non-ionic polysaccharide, said addition product having a molecular weight of at least about 100,000, said alkylene oxide having the formula

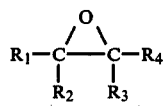

wherein $R_1$, $R_2$, $R_3$ and $R_4$ are the same or different and are selected from the class consisting of hydrogen and lower alkyl groups containing from one to five carbon atoms, said linear, non-ionic polysaccharide formed of repeating structural units having the formula

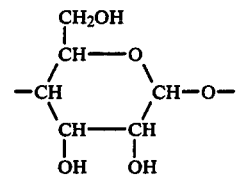

said addition product being cross-linked by said polyisocyanate such that there is a minimum of an average of one cross link for every 2,000 of said repeating structural units up to a maximum of an average of one cross link for every 20 of said repeating structural units.

6. The composition of claim 5 in which said aqueous solution contains from about 0.05% to about 1% by weight of said water-soluble reaction product.

7. The composition of claim 5 in which said addition product comprises hydroxyethyl cellulose containing from about 30% to about 70% by weight of ethylene oxide.

* * * * *